United States Patent [19]
LaRocca

[11] 3,760,507
[45] Sept. 25, 1973

[54] WHEEL ALIGNMENT GAUGING APPARATUS
[76] Inventor: Michael A. LaRocca, 167 Davis Ave., Pittsburgh, Pa. 15202
[22] Filed: July 12, 1971
[21] Appl. No.: 161,641

[52] U.S. Cl. ........................... 33/203.17, 33/203.21
[51] Int. Cl. .......................................... G01b 5/255
[58] Field of Search ................... 33/203.18, 203.17, 33/203.2, 203.21

[56] References Cited
UNITED STATES PATENTS
2,623,297  12/1952  Arthur ........................... 33/203.17

FOREIGN PATENTS OR APPLICATIONS
1,147,520  6/1957  France ........................... 33/203.15

*Primary Examiner*—William D. Martin, Jr.
*Attorney*—Donn J. Smith

[57] ABSTRACT

The wheel alignment gauging apparatus comprises a base member, a first upright affixed to the base member, a second upright adjustably secured to the base member, and index means mounted on each of the uprights. Each of the index means cooperate with marking means on wheels for which the guage structure is used. Means are provided for moving each of said index means longitudinally of its associated upright.

16 Claims, 15 Drawing Figures

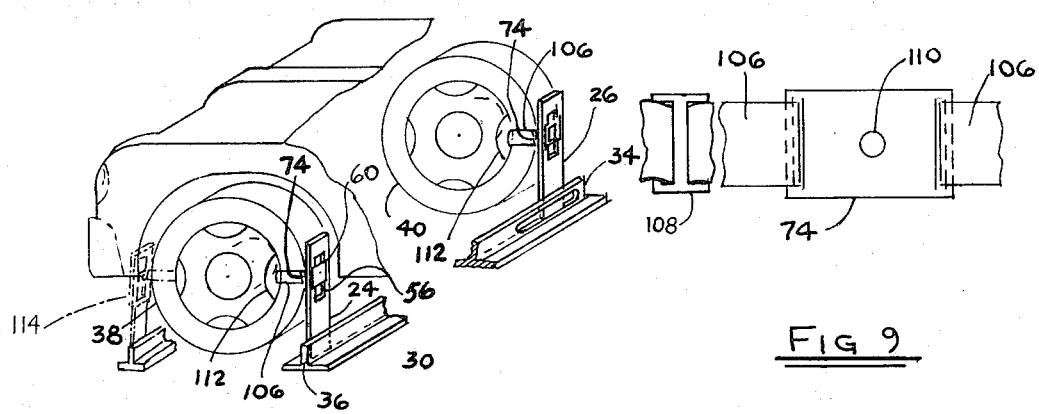
FIG 8 / FIG 9
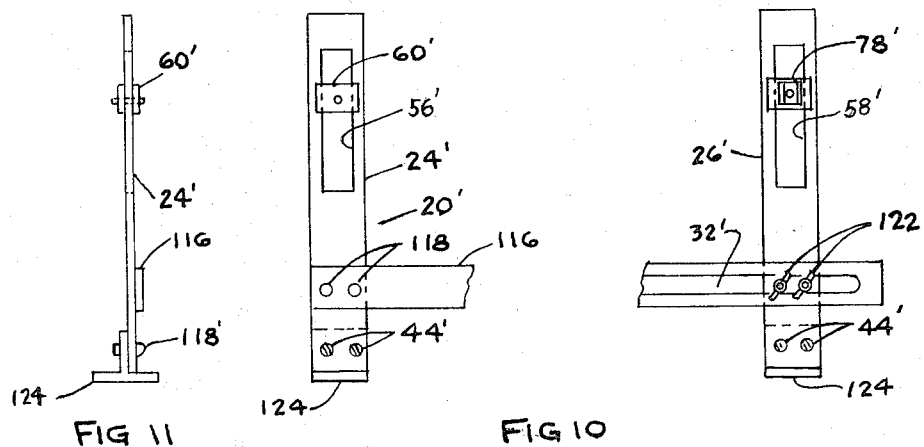
FIG 11 / FIG 10
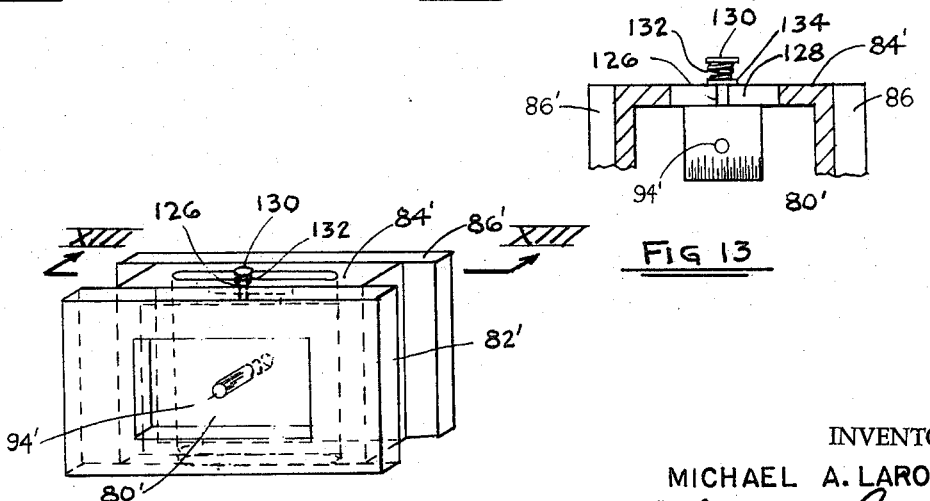
FIG 13 / FIG 12
INVENTOR.
MICHAEL A. LAROCCA
BY
HIS ATTORNEY

PATENTED SEP 25 1973

INVENTOR.
MICHAEL A. LAROCCA

BY Don Smith
HIS ATTORNEY

WHEEL ALIGNMENT GAUGING APPARATUS

The present invention relates to apparatus for use in gauging the alignment of vehicle wheels or the like and more particularly to apparatus of the character described which is capable of determining whether and how much an adjustment in wheel alignment is required and also whether an alignment is within specifications when once made.

The proper alignment of the pneumatic tires of automotive vehicles has long been a problem. Not infrequently the wheels of such vehicles, especially the front wheels, are knocked out of alignment by striking road obstacles and the like, which then results in excess wear on the tires. Running the vehicle with the wheels misaligned usually causes more tire wear than many many miles of use under conditions of proper adjustment.

Normally, the front wheels of the vehicle are toed-in slightly to maintain a "feel" of the road, to facilitate steering and control of the vehicle, and to bias the steering assembly of the vehicle to a straight ahead or straight line position when the steering wheel is turned from such position and subsequently released. With the vast majority of automotive vehicles, only a very slight toe-in is required to accomplish these objectives. The specifications for the majority of the vehicles usually require a center line to center line measurement at the front of the front wheels of minus one-sixteenth to minus one-eighth relative to the center line measurement at the rear of the front wheels. A toe-in of less than this amount fails to accomplish one or more of the stated objectives, while a toe-in greater than this amount or even on the high side of the aforesaid range causes rapid wearing of the front tires. The rate of wear increases geometrically with the increase in toe-in, as the wheels are subjected to an increased "scrubbing" action at their contact or "footprint" on the road surface.

Previous wheel alignment gauges have suffered from the disadvantages of undue complexity, difficulties of reading or manipulating scale indicia when provided, and inaccuracies stemming from the manner in which the conventional alignment gauges are applied to the vehicle tires to obtain a measurement, to mention but a partial list of such disadvantages. Insofar as is known, conventional alignment gauges uniformly rely on measurements taken on the tire sidewalls or related to the circumferential mark applied to the tire, with resultant inaccuracies. Conventional wheel gauges for the most part are not capable of successive measurements at the front and rear of the vehicle wheels without turning the alignment gauge end for end. Likewise unknown among conventional alignment gauges, are readily movable scale means which can be read with facility.

Measuring from the sidewalls of the tires of course introduces inaccuracies as the wheel itself may be distorted, the sidewalls may be scuffed, in addition to considerable variation owing to manufacturing tolerances. With those gauges where the measurement is made by sighting a marked line on the tire with a pointer, the manner of applying the mark in the first place can lead to inaccuracies. Secondly, there is likely to be operational error in aligning the pointer with the marked line, depending on the angle at which it is viewed. Moreover, in order to mark the tire with any sort of accuracy, the vehicle must be lifted so that the wheels can rotate freely.

Insofar as is known there is no alignment gauge extent which is capable of horizontal adjustment as to distance between a pair of vertical pointers or index means for vehicles having differing track widths, and which is also capable of vertical adjustment as to each of its pointers or index means to accommodate vehicles having differing wheel diameters. Similarly conventional wheel alignment gauges have no provision for moving a scale means for both horizontal and vertical adjustment. By the same token there are no known means for adjusting the scale means horizontally both of the alignment gauge generally and of one of its pointers or index means in particular.

I overcome these disadvantages of conventional wheel alignment gauges by providing wheel alignment gauging apparatus comprising a base member, a first upright affixed to said base member, a second upright adjustably secured to said base member, index means mounted on each of said uprights, each of said index means being cooperative with marking means on wheels for which said gauging apparatus is used and means for moving each of said index means longitudinally of its associated upright.

I also desirably provide similar wheel alignment gauging apparatus wherein each of said index means has a pointer on each side thereof so that measurements can be made with said gauging apparatus at the front and rear of vehicle wheels without turning said gauging apparatus end for end.

I also desirably provide similar wheel alignment gauging apparatus wherein said gauging apparatus includes a pair of indexing members, means for detachably securing said indexing members to a pair of vehicle wheels respectively, cooperating means on each of said index means and on said indexing members for precisely positioning said index means respectively on each of said indexing members.

I also desirably provide similar wheel alignment gauging apparatus said gauging apparatus includes scale means, and means are provided for moving said scale means both longitudinally and transversely of said apparatus.

I also desirably provide similar wheel alignment gauging apparatus wherein scale means are mounted on one of said index means.

I also desirably provide similar wheel alignment gauging apparatus wherein said scale means include a scale member movably mounted on one of said index means for movement along a guideway thereon extending transversely of the associated upright.

I am aware of a number of issued patents in this field, viz. the U.S. Pats. to Limpert No. 1,810,429; Phelps No. 1,877,045; Laughlin No. 2,401,255; Fields 2,434,205; and Phillips No. 2,543,197. Similar alignment devices have been advertised recently by J. C. Whitney & Company, Chicago, Illinois in their 1971 automotive catalog No. 287, at page 84. However, none of these references disclose the novel features of the invention as outlined above and described more particularly below.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 8 is an isometric view of the apparatus shown in FIG. 1 as applied in the alignment of front wheels of an automotive vehicle.

FIG. 9 is an enlarged elevational view of one of the measuring straps employed in conjunction with the apparatus of FIGS. 1 and 8.

FIG. 10 is a front elevational view of a modified form of wheel alignment gauge according to the invention and FIG. 11 is a side elevational view of the alignment gauge as shown in FIG. 10.

FIG. 12 is a view similar to FIG. 7B but showing a modified form of index and scale means usable with the apparatus of FIG. 1 or of FIG. 10.

FIG. 13 is a cross sectional view of the index and scale means as shown in FIG. 12 and taken along reference line XIII—XIII thereof.

Figure 2:
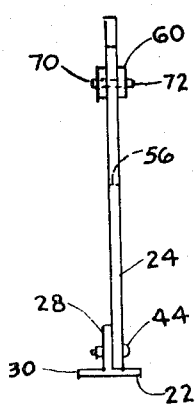
FIG. 2 is a left end elevational view of the apparatus as shown in FIG. 1.
Figure 1:
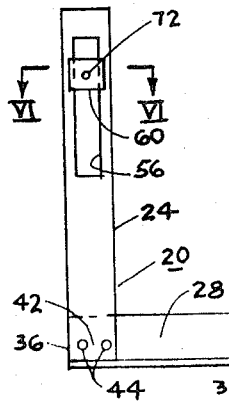
FIG. 1 is a front elevational view of one arrangement of wheel alignment gauge according to the invention.
Figure 3:
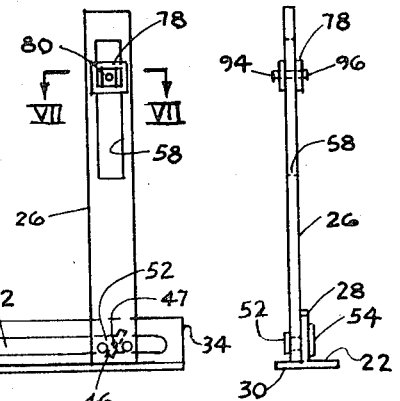
FIG. 3 is a right end elevational view of the apparatus as shown in FIG. 1.

With initial reference now to FIGS. 1–3 of the drawings, the exemplary form of wheel alignment gauge 20 shown therein comprises a base member 22, fabricated from a good structural material such as aluminum steel or a rigid plastic, and a pair of uprights 24, 26. The base member 22 can be provided in the form of an elongated member having a T-shaped cross section as better shown in FIGS. 2 and 3 or other angular disposition of vertical and horizontal webs 28, 30 such as an L or U configuration. A portion of the base member 22 is slotted at 32 to afford a horizontal adjustment for the associated one of the uprights, for example, the upright 26. The overall length of the base member 22 is sufficient to span the widest vehicle track of the type of automotive vehicle with which the wheel alignment gauging apparatus 20 is likely to be employed. Similarly, the slot 32 extends inwardly from the adjacent end 34 of the base member to a point equivalent to the narrowest track of such type of automotive vehicles.

Desirably the horizontal web 30 (as viewed in the drawings) is of sufficient width that the wheel alignment gauge 20 will be more or less free standing, as shown in FIG. 8. On the other hand, the vertical web 28 of the base member 22 is of sufficient height at least in the area of the slot 32 and adjacent the opposite end 36 of the base member 22 to afford stabilized vertical supports for the uprights 24, 26, respectively. The uprights 24, 26 preferably are secured to the base member 22 in a manner to reserve a parallelism therebetween irrespective of the adjusted position of one of the uprights for example the upright 26 along slot 32 therefor. The other of the uprights, for example the upright 24 can be fixedly secured to the base member 22. Preservation of the aforementioned parallelism facilitates measurement of the front wheels 38, 40 of the vehicle, as discussed below with reference to FIG. 8.

The fixed upright 24 can be bolted at its lower end 42 flushly against the adjacent surface of the vertical web 28 of the base member 22. Other fastening means can be employed in place of bolting, for example welding or riveting. Preferably at least two fastening means 44 are employed to aid in maintaining a predetermined angular disposition of the upright 24 relative to the base member 22. In this arrangement the upright 24 is stabilized in a perpendicular disposition relative to the base member 22. As an aid in assembly and in maintaining such disposition the lower end portion 42 of the upright 24 can be squared off so as to seat flushly against the horizontal web 30 of the base member 22. Accordingly when the fastening means 44 are tightened with the end of the upright 24 seated against the horizontal web 30 there is no tendancy of the upright 24 to rock or otherwise angularly displace with respect to the base member 22.

The upright 26 is likewise secured to the vertical web 28 of the base member 22 and in this example is likewise provided with a squared off lower end portion 46 seated flushly against the horizontal web 30 of the base member to aid in maintaining parallelism between the uprights 24, 26. The upright 26, however, is releasably secured to the vertical web 28 at its longitudinally extending slot 32 for adjustable movement along the length of the slot 32. By so moving the upright 26 the alignment gauge 20 can accommodate a wide range of vehicle track widths, as described previously. The slot 32, therefore, can be made relatively shorter or longer than shown in the drawings to accommodate a correspondingly narrower or wider range of vehicle track widths. Suitable fastening and stabilizing means 47 are provided for the upright 26 and in this example are extended through the slot 32 and through respective apertures therefor in the lower end portion 46 of the upright 26. Such fastening means when tightened secure the upright 26 with its squared off lower end flushly against the horizontal web 30 irrespective of its location along the slot 32. In this manner the advantageous parallelism between the uprights 24, 26 is maintained irrespective of an adjusted position of the upright 26 for a particular vehicular track width.

Figure 4:
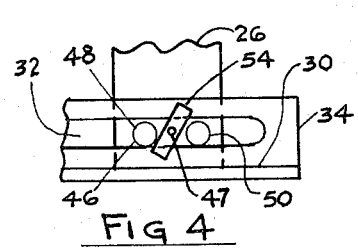
FIG. 4 is a partial enlarged rear elevational view of the lower right hand portion of the apparatus as shown in FIG. 1.
Figure 5:
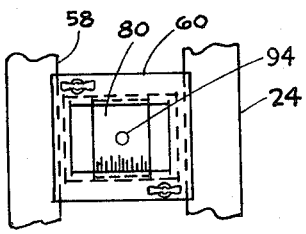
FIG. 5 is an enlarged partial view of the scale means shown in FIG. 1.

One form of such fastening and stabilizing means, as shown more particularly in FIG. 4 of the drawings, includes a pair of tub rollers 48, 50 rotatably secured to the lower end portion 46 of the upright 26 and protrudable through the slot 32. Each roller 48 or 50 is of slightly smaller outside diameter than the width of the slot 32 to ensure ready movement of the rollers 48, 50 along the length of the slot 32 when required. The diametric relationship of the rollers 48, 50 with respect to the slot width further ensures that the top surfaces of the rollers and the rectilinear end portion of the upright 26 will not bind between the upper edge of the slot 32 and the juxtaposed surface of the horizontal web 30 respectively, while at the same time ensuring a flush engagement between the lower end of the upright 26 and the horizontal web 30.

The fastening and stabilizing means 47 for the upright 26 further include a bolt 52 and nut 54 of unusual configuration mounted in this example between the rollers 48, 50. In this arrangement the nut 54 is elongated such that a corner thereof becomes cocked and bound against the adjacent surface of the horizontal web 30 of the base member 22, which aids in tightening the nut and bolt 52, 54 and also tends to retain the nut 54 against losening thereof. Preferably the rollers 48, 50 terminate flush with the adjacent slot edges so that the nut 54 passes freely thereover when making its less than one revolution permitted by the adjacent surfaces of the horizontal web 30. As shown in FIG. 1 the machine screw 52 can be provided with a screw driver slot or other tool engaging configuration. Thus, the fastening and stabilizing means 47 can be readily manipulated to permit movement of the upright 26 along the slot 32 and subsequent tightening thereof. At the same time the desired parallelism is maintained, both during adjustment of the upright 26 and when it is resecured to the vertical web 28 of the base member 22.

In order to accommodate various vehicles having wheels of different diameters, each of the uprights 24 or 26 is provided with a vertical adjustment slot 56 or 58. The vertical slots 56, 58 are of sufficient height to accommodate the various wheel sizes that may be encountered on the types of automotive vehicles with which the alignment gauge 20 may be used. The vertical adjustment slots 56, 58 are included as it is desirable to measure the center line distances between the vehicle wheels approximately at the elevation of the wheel axles. As it is not necessary to lift the vehicle, the axle elevations can be readily indicated for a given vehicle by suitable indexing means provided on the wheel alignment gauging apparatus 20 and movable along the lengths of the upright slots 56, 58.

Figure 6:
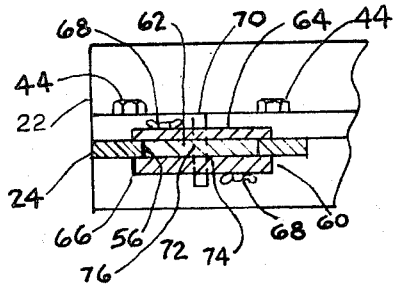
FIG. 6 is an enlarged partial cross sectional view of the apparatus as shown in FIG. 1 and taken along reference line VI—VI thereof.

One arrangement of such indexing means, as denoted by the reference numeral 60, is mounted on the stationary upright 24, and is shown in greater detail in FIG. 6 of the drawings. In this arrangement the index means 60 include a central plate 62 which is overlayed on its opposite sides with cover plates 64, 66. The central plate 66 substantially bridges the width of the slot 56, while the cover plates 64, 66 overly the slot edges adjacent each end of the central plate 62 to entrap the central plate within the vertical adjustment slot 56. The three plates 62–66 can be fastened together by suitable fastening means 68 so that the index means 60 thereby can be slid unitarily along the length of the slot 56. Desirably the fastening means 68 can be of a readily releasable type, such as a machine screw and thumb nut, so that the index means 60 can be releasably secured at a selected position along the length of the vertical adjustment slot 56. In furtherance of this purpose the central plate 62 can be made slightly thinner than the upright 24 along the length of its slot 56 to ensure a clamping engagement with the cover plates 64, 66 when the fastening means 68 are tightened. The material of the upright 24 adjacent its slot 56 preferably is of uniform thickness to facilitate sliding the index means 60 therealong.

Each of the cover plates 64, 66 is provided with an index pin 70 or 72 for cooperation with index plate 74 (FIGS. 8 and 9) described below. Desirably the index pins 70, 72 protrude from either side of the index means 60 in mutual alignment such that the alignment gauge 20 can be utilized at the rear surfaces of the vehicle wheels 38, 40 and then at the front surfaces thereof without turning the alignment means end for end. By aligning the index pins 70, 72 accuracy is assured irrespective of which side of the upright 24 is juxtaposed to the wheel surface and the index plates 74 described below. To ensure such alignment, a continuous pin as denoted by chain outline 76 thereof can be extended through all three of the index means plates 62-66 such that its respective ends provide the index pins or pointers 70,72.

The vertical adjustment slot 58 of the adjustable upright 26 is similarly disposed therein and preferably is of the same length as the slot 56 of the fixed upright 24, for the reasons mentioned previously. Another form of the aforementioned index means such as index assembly 78 is similarly mounted for sliding movement along the slot 58 after the fashion of the index assembly 60 of the stationary upright 24. However, as shown in FIG. 1 the index assembly 78 is provided with movable scale means including member 80 mounted thereon in a unique manner in accordance with the invention.

Figure 7A:
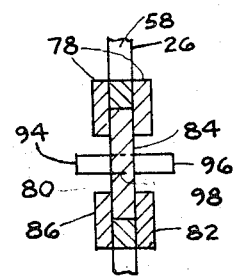
FIG. 7A is a partial cross sectional view of the apparatus as shown in FIG. 7 and taken along reference line VIIA—VIIA thereof.
Figure 7:
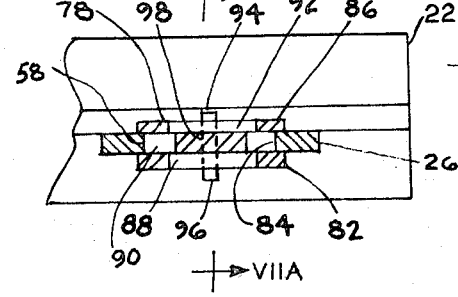
FIG. 7 is another enlarged partial cross sectional view of the apparatus as shown in FIG. 1 but taken along reference lines VII—VII thereof.

The structure of the index assembly 78 is shown more particularly in FIGS. 7, 7A of the drawings. Referring initially to FIG. 7 the index assembly 78 is formed from three frame members 82, 84, 86, the middle frame member 84 of which is shaped to bridge the width of the vertical adjustment slot 58. The outer frame members 82, 86 extend beyond the ends of the intermediate frame member 84 so as to overly the adjacent edges of the vertical adjustment slot 58 to entrap the middle frame member 84 within the vertical slot 58. The index assembly 78 as thus arranged for sliding movement along the length of the vertical slot 58, after the manner of index means 60 described above.

Each of the frame members 82–86 is provided with a relatively large central opening 88, 90 or 92 respectively, all of which are mutually aligned. However, as better shown in FIG. 7A the upper and lower edges of the opening 90 of the central frame member 84 are offset relative to the adjacent edges of the outer frame openings 88, 92 in order to entrap the scale member 80 therein. The scale member 80 is therefore slideably mounted for movement along the length of the intermediate frame member 84 and across the width of the verticle adjustment slot 58. The guideway thus formed for the scale member 80 extends transversely of the upright 26 to permit movement of the scale means both vertically (slot 58) and horizontally (guideway 88-92) of the gauging apparatus 20.

Index pins 94, 96 carried by the scale member 80 are thus capable of both vertical and horizontal adjustment as limited in the first instance by the vertical slot 58 and in the second by the length of the inner frame slot 90 (FIG. 7). This arrangement affords a remarkable facility in the use of the gauging apparatus 20 as explained below. Desirably the index pins 94, 96 of the scale member 80 are mutually aligned such that either side of the alignment gauge 20 can be presented to the vehicle wheels 38, 40. As explained previously in the case of the index pins 70, 72 of the other index assembly 60, the scale member pins can be provided by a unitary pin member, as denoted by chain outline 98 thereof in FIGS. 7, 7A.

Figure 7B:
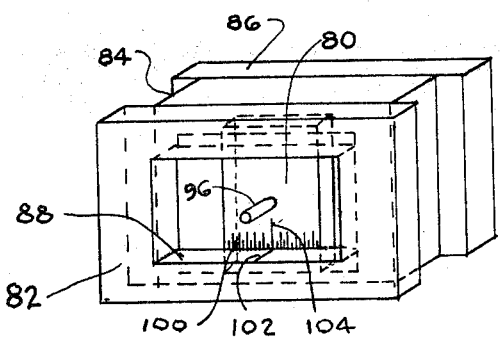
FIG. 7B is an enlarged isometric view of one of the index assemblies of the gauge as shown in FIG. 1.

As evident from FIG. 7B the scale member 80 is provided with scale indicia 100 which conveniently can be subdivided into 1/32 inch intervals for the vast majority of applications of the gauging apparatus 20. Alternatively, suitable metric units can be substituted. In any event the scale indicia 100, which desirably is provided on both sides of the scale member 80, cooperate with index marks, such as line 102 or the like, on the edges of the adjacent outer frame openings 88, 92. Accordingly, when the adjustable upright 26 is aligned with the rear side of the wheel, for example to yield a zero scale reading, the scale member 80 can be moved in either direction from the zero location to show a deviational measurement at the front of the wheel in either the positive or negative direction.

The scale member can be made wider or narrower than shown depending upon the maximum anticipated wheel alignment deviations in specific applications of the invention. By the same token the adjustable upright 26 and its slot 58 similarly can be made wider or narrower as necessary to accommodate the index assembly 78. For most applications scale indicia of about 5/8 inch on either side of zero scale index 104 is adequate. Similar scale indicia (not shown) preferably are identically located on the opposite side of the scale member 80 and on the adjacent surface of the rear frame member 86. The purpose of providing front and rear scale indicia on the scale member 80 is, again, to permit use of the alignment gauge 20 without turning end for end when measuring wheel distances at the front and rear thereof.

In operation, reference is had to FIG. 8 and 9 of the drawings. The function of the gauging apparatus 20 is to measure any deviation of the wheels 38, 40 from the specified toe-in or more properly from a disposition of zero toe-in, in order to determine whether there is need for adjustment. In making such measurement, in accordance with the invention, a distance is first measured between two arbitrary points respectively on the rear surfaces of the front wheels 38, 40. The wheels are then rotated or the vehicle is moved to bring the same points to the front of the wheels, and a measurement is again made between the same two arbitrary points (which are now at the front of the wheels). By utilizing the same arbitrary measuring points for both the rear and the front wheel measurements, the inaccuracies produced in attempting to inscribe a circumferential mark on the tires or by attempting to measure from differing points about the circumference of the tire sidewalls or tire tread, are eliminated.

By thus measuring the width of the wheel track or the distance between the wheels 38, 40 at the rear of the wheels and then at the front of the wheels as described more particularly below, there should be a difference in measurement representative of wheel toe-in condition. In most vehicles the specified difference is minus 1/16 inch i.e. the front of the wheel are closer together to this extent. If the front measurement is not within the specifications for the particular vehicle, a need for adjustment is indicated. It will be understood, of course, that the alignment gauging apparatus 20 of the invention can be used also to indicate the need for adjustment of other wheel characteristics such as castor and camber.

The measurement procedure of the invention is commenced by strapping an index plate 74 (FIG. 9) to each of the wheels being measured as shown in FIG. 8. In accomplishment of this purpose each index plate 74 is provided with a desirably elastic strap 106 provided at one of its ends with a quick attach buckle 108 or the like. Each index plate 74 has an index hole 110 into which the index pin 70, 72 of the index assembly 60 (FIGS. 2 and 6) and the index pins 94, 96 of the index assembly 78 (FIGS. 3, 7, 7A) can be closely fitted. The unique indexing arrangement of the invention further reduces the potentiality for operational error in measuring the wheels 38, 40. Considerable and unexpected improvement in accuracy thereby results. The measuring accuracy afforded by the invention is of pronounced signifigancy when it is realized that the gauging apparatus 20 is capable of measuring with an accuracy of 1/64 inch or better over a track width or distance between the wheels 38, 40 of about 5 feet.

The index plates or members 74 are applied respectively to the wheels 38, 40 by passing the strap means 106 of each plate 74 through one of the wheel slots 112, as shown in FIG. 8. Alternatively the plates 74 can be taped to the wheels 38, 40 with masking, friction or electricians' tape (not shown) or the like. When measuring wheel toe-in, the straps 106 and plates 74 preferably are located at wheel axle height as shown in FIG. 8. The vehicle is then moved to bring its wheel slots to the proper location, or the vehicle can be lifted to align the wheel slots 112, when required. After the index plates 74 are properly applied, the vehicle preferably is lowered as it is not necessary or desirable to make the wheel measurements with either or both of the wheels 38, 40 in a raised position.

After application of the index plates 74 and straps 106 to the wheels 38,40, the first measurement of the wheel track width desirably is taken at the rear of the wheels 38,40 as denoted by the solid outline position of the gauging apparatus 20 in FIG. 8. The gauging apparatus 20 is inserted beneath the vehicle to a position immediately behind the wheels as shown. The index assembly 60 of the stationary upright 24 is adjusted vertically along the vertical adjustment slot 56 until the juxtaposed one of its index pins 70, 72 fits into the index hole 110 therefor in the associated index plate 74 for example on the wheel 40. To accomplish this engagement of the index assembly 60 and its associated index plate 74 the index assembly is moved vertically and the entire gauging apparatus 20 is moved horizontally to accomplish the engagement.

With the alignment gauge 20 and its index assembly 60 thus positioned, the fastening and stabilizing means 47 of the adjustable upright 26 is loosened sufficiently to permit movement of the adjustable upright 26 along its adjustment slot 32 in the base member 22. The adjustable upright 26 and its index assembly 78 are moved horizontally and vertically respectively until the juxtaposed one of the index pins 94, 96 of the index assembly 78 can be engaged with the index hole 112 of the associated index plate 74. With both index assemblies 60, 78 now engaged with their respective index plates 74, the movable upright 26 is again adjusted until the index mark 102 of its index means 78 is properly aligned with its scale indicia 100, preferably with its zero marker 104 as shown in FIG. 7B. When the index assembly 78 of the adjustable upright 26 is thus "zeroed" the fastening and stabilizing means 47 of the adjustable upright 26 is secured to prevent further movement of the upright 26 and to preserve the "zeroing" measurement thus obtained.

The thus measured distance between the index plates 74 at the rear of the wheels 38, 40 is maintained by the gauging apparatus 20 owing to the preserved parallelism of its uprights 24, 26, one of which has been adjusted along the length of the base member 22 to zero its scale member 80. Elaborate scale means are not required for the gauging apparatus 20 as the gauge is intended to measure only the differential measurements from the rear to the front of the wheels 38, 40, or vice versa.

Although the alignment gauge 20 is constructed in a sturdy fashion as described previously, it is now carefully removed from its position at the rear of the wheels 38, 40 to avoid any chance of distorting the parallelism of the uprights 24, 26. It is not necessary to preserve the vertical positions of the index assemblies 60, 78 as all portions of their respective vertical adjustment slots 56, 58 are equidistant. Likewise it is not necessary to preserve the horizontal position of the scale member 80 as its "zeroed" condition provides a "memory."

The vehicle is now pushed forward to the extent of about one-half revolution of the wheels 38, 40 to bring their index plates 74 to the front to the front sides of the wheels. If it is not feasible to move the vehicle, the vehicle can be raised to permit independent rotation of the wheels 38, 40.

The gauging apparatus 20 is now inserted again beneath the vehicle this time to a position in front of the wheels 38, 40 as denoted by chain outline 114 of the apparatus 20 in FIG. 8. It is noteworthy that the gauging apparatus 20 need not be turned end to end owing to its dual index pin arrangements 70, 72 and 94, 96 of its index means or assemblies 60, 78 respectively. The index assembly 60 of the stationary upright 24 is again engaged with its associated index plate 74 on the wheel 40 with any required vertical movement of the index assembly 60 and horizontal movement of the entire gauging apparatus 20. With the gauging apparatus 20 again positioned in this manner relative to the wheels 38, 40 the other index assembly 78, i.e., on the adjustable upright 26, is then fitted into its associated index plate 74 of the wheel 38. In contrast to the procedure of the initial or zeroing measurement at the rear of the wheels 38, 40, the deviational measurement at the front of the wheels 38, 40 does not require the adjustable upright 26 to be moved with respect to the base member 22 (except for such severe misalignment wherein the deviational measurement would be off-scale). Instead, any positive or negative deviation of index plate 74 and the wheel 38 is registered by the required horizontal movement of the scale member 80 (together with any requisite vertical adjustment of the entire index assembly 78 along upright slot 58) to fit the associated index plate 74. As noted previously, minor vertical adjustments of either index assembly 60 or 78 have no effect upon the deviational or front measurement relative to the zeroing or rear measurement, owing to the parallelism of the uprights 24, 26 and their vertical adjustment slots 56, 58 respectively.

Once the index pins of the gauging apparatus 20 are thus inserted the positive or negative deviation of the wheels 38, 40 from a state of parallelism can be read directly from the scale indicia 100 of the scale member 80 (FIG. 7B), with negative deviations being registered to the left of the zero index 104 and positive deviations to the right. Conversely, the positive and negative scale indicia locations would be interchanged if the zeroing measurement were taken at the front of the front vehicle wheels 38, 40 and the deviational measurement taken at the rear thereof.

When making the deviational measurement with the gauging apparatus 20, as described above, in almost every instance the scale indicia 100 will show a deviation. Assuming that the toe-in specification for the vehicle is 1/16 to 3/32 inch, if the scale indicia 100 shows a deviation of minus 1/16 inch, i.e., to the left of the zero index 104, the toe-in will be within specifications for that particular vehicle. However, if the deviational measurement is minus one-eighth inch and the desired toe-in is one-sixteenth inch, it will be necessary to adjust the wheels 38, 40 such that the scale member 80 will show a minus deviation of 3/32 inch in order to obtain a toe-in of one-sixteenth inch, as the rear surfaces of the wheels 38, 40 will be moved closer by an amount equal to that by which the front portions of the wheels are separated. Owing to the sturdy construction of the gauging apparatus 20, the same can be left in place while the toe-in or other characteristic of the wheels 38, 40 is adjusted in the usual manner.

Referring now to FIGS. 10 and 11 of the drawings, a modified arrangement 20' of my gauging apparatus is shown therein, where similar reference characters with primed accents denote similar components of the preceding figures. The gauging apparatus 20' is provided with a fixed upright 24' and an adjustable upright 26' each having a vertically adjustable index assembly 60' or 78', after the manner of the preceding figures. The base member 22 of the preceding figures, however, is replaced with a cross brace 116 of a length similar to that of the base member 22. the cross brace 116 desirably is a flat strip of structural material such as steel and, as evident from a comparison of FIGS. 10 and 11, is rigidly secured by fastening means 118 to the fixed upright 24' and is adjustably secured by means of its longitudinal adjustment slot 32' to the adjustable upright 26'. The fastening and stabilizing means 47 of FIG. 4 can be employed for this purpose or alternatively the upright 26' can be secured and stabilized by a pair of machine screws 120 and thumb nuts 122. Desirably the diameter of the machine screws 120 are about equal to the width of the slot 32' to aid in stabilizing the adjustable upright 26' in a perpendicular disposition relative to the cross brace 116. The cross 116 therefore maintains a condition of parallelism between the vertical uprights 24', 26' for the reasons mentioned previously.

The gauging apparatus 20' is rendered self-standing by a short section 124 of a T-beam or the like secured to the lower end of each of the uprights 24', 26' as shown in FIGS. 10 and 11. The beam sections or stands 124 can be fastened as shown to the lower end portions of the uprights, or alternatively they can be formed integrally therewith. Differing cross-sectional shapes of stands (not shown) obviously can be substituted.

The cross brace 116 is thus elevated above the stands 124 or lower ends of the uprights 24', 26' such that the cross brace 116 can clear any obstacles beneath the vehicle and between the wheels being measured. For example the elevated cross brace 116 will clear the guide or floor flanges of a grease pit or the like. The gauging apparatus 20' of FIGS. 10 and 11 is otherwise manipulated after the manner described in connection with FIGS. 8 and 9 in obtaining zeroing and deviational measurements of the wheels 38, 40.

With reference now to FIGS. 12 and 13 means are associated with a modified scale member 80' for restraining the movement thereof along the associated frame member 84'. One form of such restraining means includes a stud pin 126 secured in this example to the upper edge of the scale member 80' as better shown in FIG. 13. The stud pin 126 rides along slot 128 in the upper edge of the central frame member 84' as better shown in FIG. 12. The length of the slot 128 is equivalent to the range of horizontal movement of the scale member 80'. The pin 126 is provided with a headed outer end 130 whereby a spring 132 or other biasing means are retained between the end 130 and the adjacent edge portions of the frame member 84'. A washer 134 can be fitted over the pin 126 and between the biasing means 132 and the adjacent surfaces of the intermediate frame member 84' to prevent wear upon the spring 132. The spring or biasing means 132 results in the application of sufficient forces to the scale member 80' and associated components of the indexing assembly 78' for frictional restraint of the scale member 80' against inadvertent movement. Thus, during the use of the gauging apparatus of the invention the scale member 80' readily maintains a given scale setting.

From the foregoing it will be apparent that novel and efficient forms of wheel alignment gauging apparatus have been described herein. While I have shown and described certain presently preferred embodiments of the invention and have illustrated presently preferred methods of practicing the same it is to be distinctly understood that the invention is not limited thereto but may be otherwise variously embodied and practiced within the spirit and scope of the invention.

I claim:

1. Vehicle wheel alignment gauging apparatus comprising a base member, a first upright affixed to said base member, a second upright adjustably secured to said base member for movement therealong so that said uprights can be positioned generally in the planes of circumferences of wheels for which the gauging apparatus is used, index means mounted on each of said uprights, each of said index means being positioned on the associated one of said uprights for cooperation with marking means on said wheel circumferences, and means for moving said index means longitudinally of their respective uprights, said uprights being shaped so that said index means move generally in said wheel circumference planes.

2. The combination according to claim 1 wherein said uprights and the indexed means thereon are shaped for positioning said gauging apparatus alternately in front of and behind said wheels with said uprights disposed respectively in said wheel circumference planes, each of said index means having a pointer on each side thereof disposed substantially in the associated circumference plane so that measurements can be made with said gauging apparatus at front and rear positions juxtaposed to said wheel circumference planes without turning said gauging apparatus end for end.

3. The combination according to claim 1 wherein said gauging apparatus includes a pair of indexing members, means for detachably securing said indexing members to a pair of vehicle wheels respectively so that said members lie substantially within said wheel circumference planes respectively, cooperating means on each of said index means and said indexing members for precisely positioning and detachably engaging said index means respectively on said indexing members.

4. The combination according to claim 3 wherein said cooperating means include index pin and aperture means, said apertures closely receiving said pins respectively so that said indexing means are precisely located with respect to said indexing members and said wheel circumferences respectively by insertion of said pins into said apertures.

5. The combination according to claim 1 wherein scale means are mounted on one of said index means.

6. The combination according to claim 5 wherein means are provided for moving said scale means and a pointer of the associated index means laterally of the associated upright.

7. The combination according to claim 1 wherein said gauging apparatus includes scale means, and means are provided for moving said scale means both longitudinally and transversely of at least one of said uprights.

8. The combination according to claim 1 wherein the adjustable securance of said second upright includes a longitudinal slot in said base member and fastening means for said second upright having a width about equal to that of said slot to stabilize said second upright relative to said base member.

9. Wheel alignment gauging apparatus comprising a base member, a first upright affixed to said base member, a second upright adjustably secured to said base member for movement therealong, index means mounted on each of said uprights, each of said index means being cooperative with marking means on the circumferences of wheels for which said gauging apparatus is used, means for moving each of said index means longitudinally of its associated upright, said index means moving means including a slot in each of said uprights and extending longitudinally thereof, each of said index means being mounted substantially within the associated upright slot and slidably engaging the upright edge portions adjacent the slot of the associated upright for movement therealong, and a pointer positioned on each of said index means for movement therewith longitudinally of the associated upright.

10. Wheel alignment gauging apparatus comprising a base member, a first upright affixed to said base member, a second upright adjustably secured to said base member, index means mounted on each of said uprights, each of said index means being cooperative with marking means on wheels for which said gauging apparatus is used, means for moving each of said index means longitudinally of its associated upright, said index means moving means including a slot in each of said uprights and extending longitudinally thereof, each of said index means being mounted substantially within the associated upright slot and slidably engaging the upright edge portions adjacent the slot of the associated upright, and scale means movably mounted on one of said index means.

11. The combination according to claim 10 wherein said scale means includes a scale member slidably mounted on said one index means for movement therealong in a direction transversely of the associated upright slot.

12. The combination according to claim 10 wherein a pointer member is mounted on said scale means.

13. The combination according to claim 11 wherein an index pin is mounted on each side of said scale member.

14. The combination according to claim 11 wherein biasing means are mounted on said one index means and said scale member for restraining the movement of said scale member along said one index means.

15. The combination according to claim 5 wherein said scale means include a scale member movably mounted on one of said index means for movement along a guideway thereon extending transversely of the associated upright.

16. The combination according to claim 9 wherein at least one of said pointers is slidably mounted on the associated index means for lateral movement thereof relative to both said index means and said upright slots.

* * * * *